Oct. 28, 1969    TAKESHI HASEGAWA ET AL    3,475,211
DURABLE RESISTIVE ELEMENT OF GLASS AND A PROCESS FOR
PREPARING THE SAME
Filed Feb. 13, 1967    2 Sheets-Sheet 1

INVENTORS
TAKESHI HASEGAWA,
YASUHIRO SHINDO

BY Stevens, Davis, Miller & Mosher

ATTORNEYS

INVENTORS
TAKESHI HASEGAWA
YASUHIRO SHINDO

BY

ATTORNEYS

United States Patent Office 3,475,211
Patented Oct. 28, 1969

3,475,211
DURABLE RESISTIVE ELEMENT OF GLASS AND A PROCESS FOR PREPARING THE SAME
Takeshi Hasegawa, Neyagawa-shi, and Yasuhiro Shindo, Osaka, Japan, assignors to Matsushita Electric Industrial Co., Ltd., Kadoma-shi, Osaka, Japan, a corporation of Japan
Filed Feb. 13, 1967, Ser. No. 615,401
Claims priority, application Japan, Feb. 21, 1966, 41/11,260, 41/11,261
Int. Cl. C03c 21/00, 17/22
U.S. Cl. 117—216      4 Claims

ABSTRACT OF THE DISCLOSURE

A durable resistive element of glass having a non-porous resistance uniform layer of carbon-glass or carbon-metal-glass system resistance layer, which is prepared by placing a porous highly siliceous glass substrate in a furnace in which a hydrocarbon vapor flows to deposit cracked carbon in and on the glass substrate and thereafter introducing an oxygen stream into said furnace to scatter the outside cracked carbon only from said substrate. These steps are repeated several times. The resulting glass substrate having cracked carbon on both inside and outside thereof is then subjected to a heat treatment in a non-oxidizing atmosphere whereby the glass is converted into a non-porous state. Oxygen or air is passed on the glass substrate to take off carbon on the surface thereof to firmly maintain the resistive layer in the substrate.

---

This invention relates to a resistive element and a method for manufacturing the same. More particularly, it relates to a resistive element having an electroconductive material fixed in a glass and to a method for manufacturing the same.

The result of studies by the present inventors showed that a comparatively thick and durable resistive element having excellent physical properties, such as heat-resistance, moisture-resistance, impact-resistance and adjustability, can be produced economically or on a commercial scale.

It is therefore an object of the present invention to provide such resistive element.

It is another object of the present invention to provide a method for producing such resistive element in a manner suitable for mass production.

These and other objects and advantages of the present invention will become apparent to those skilled in the art from a consideration of the following specification and claims.

According to the present inveniton it has been found that there is provided a comparatively thick and durable resistive element having an electroconductive material fixed in a glass which is excellent in heat-resistance, moisture-resistance and impact-resistance and which is easily adjustable with respect to its resistivity, readily subjected to cutting or other processes and adapted for mass production. Said resistive element can be produced by incorporating an electroconductive material in the pores of a porous highly siliceous glass and thereafter converting the same into a non-porous state so that said electroconductive material is firmly sustained inside the body of said glass.

The cracking treatment is conducted in a furnace at a temperature between 850 and 1,000° C., which comprises reduction of pressure and introduction of a stream of hydrocarbon vapor for cracking, followed by a stream of oxygen or an oxygen-containing gas such as air for scattering the outside carbon from the surface of the substrate. In the last cycle of said treatment, the introduction of a stream of oxygen or air is omitted. After several cycles of such cracking, the substrate is subjected to a heat treatment at 900° C. or more in a non-oxidizing atmosphere and converted into a non-porous state. The outside carbon film is then scattered by passing air or oxygen gas on the substrate, and a product resistive element having a uniform, non-porous resistance layer of carbon-glass system can be obtained.

The present invention also contemplates production of carbon-metal-glass resistance layer. In this case, a porous highly siliceous glass substrate is first soaked in and impregnated with a solution of a metal compound such as chloride. The substrate is then subjected to reduction by hydrogen or cracking to the corresponding metal element under heating condition of 900° C. or below. The resulting substrate now including the metal element in its pores is then subject to the same treatments as stated above.

The preferable embodiments of the present invention are further described in connection with the accompanying drawing in which.

Figure 1A:
FIG. 1 is a schematic view of a preferred embodiment illustrating the manufacture of a resistive element of the present invention.
Figure 1B:
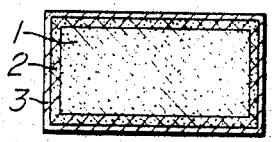
Figure 1C:
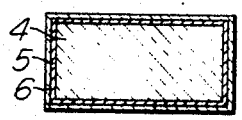
Figure 2A:
FIG. 2 is a schematic view of another preferred embodiment illustrating the manufacture of a resistive element of the present invention.
Figure 2B:
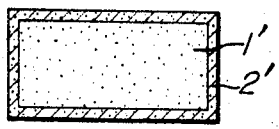
Figure 2C:
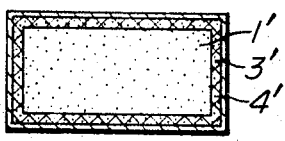
Figure 2D:
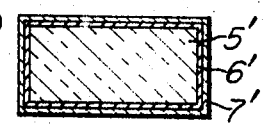

Referring now to FIG. 1, a porous highly siliceous glass substrate 1 of (A) is placed in a furnace heated at 850 to 950° C. The pressure inside the furnace is reduced and a vapor of hydrocarbon is caused to flow into the furnace. The introduction of a stream of hydrocarbon vapor results in deposition of cracked carbon 2 and 3 inside and outside said substrate 1. Air is then allowed to flow through the furnace for a suitable time depending upon the thickness of the carbon film 3 so that the carbon film 3 only on the surface is scattered off. Again the pressure in the furnace is reduced and a hydrocarbon vapor is caused to flow into the furnace. This thermal cracking cycle is repeated several times. In the last cracking cycle, the resulting outside carbon film is not scattered. The substrate is allowed to cool and removed from the furnace in a form (B). This is then subjected to a heat treatment at 900° C. or more in a non-oxidizing atmosphere so as to completely convert the porous substrate into a non-porous state. Thus the cracked carbon 2 deposited inside the body of the glass substrate 1 can be confined or sealed within the substrate. Thereafter air is allowed to flow so as to completely scatter the outside carbon film 3 from the surface of said substrate 1, which substrate is then removed from the furnace and cooled. The resistive element thus obtained is shown as (C). In the (C), a non-porous resistance layer 5 consisting of carbon and glass is formed in the periphery of a non-porous glass 4. In the outer-most surface is formed an extremely thin glass layer 6 which is also non-porous. This non-porous glass layer 6 in the outer-most surface was a resistance layer when the heat treatment was conducted. In the subsequent treatment for scattering the carbon film 3, a part of outer portion of the carbon 2 is also scattered, which results in said layer 6 as shown.

Referring to FIG. 2, a porous highly siliceous glass substrate 1' of (A') is soaked in a solution of a metal compound for several minutes. The soaking time depends upon the thickness of the substrate 1' to be impregnated. The substrate 1' is thus impregnated with the solution. The metal compound is then reduced by hydrogen or cracked to the corresponding metal element as shown in (B') wherein the metal layer is indicated as 2'. The substrate thus treated is then placed in a vacuum furnace under reduced pressure and at 850 to 950° C.

The subsequent treatment is the same as described with FIG. 1. In (C') of FIG. 2, a mixed layer 3' of the resulting metal and the glass, and a cracked carbon film layer 4' are shown.

In (D'), a non-porous highly siliceous glass 5', a mixed non-porous layer 6' of the metal, carbon and glass surrounding the same an extremely thin, non-porous layer 7' are shown. This outer-most layer 7' can be obtained by the same heat treatment as described with FIG. 1.

The following examples are given merely as illustrative of the present invention and thus are not to be considered as limiting.

EXAMPLE 1

A method described with reference to FIG. 1 was conducted. The starting material was a porous highly siliceous glass 1 having a resistive element size (a size at complete contraction) of 7 $\varphi$ x 23 mm. A benzene vapor which was maintained at 50° C. was introduced into the furnace kept at 890±3° C. and at 3 mm. Hg or less. A cycle of the cracking step consisted of maintenance of vacuum for five minutes, benzene flow for 20 minutes and air flow for two minutes. Three cycles were effected and in the last one the air flow was omitted.

The substrate was then treated at 1,150° C. in the nitrogen atmosphere for 30 minutes and thereby converted into a non-porous state. Then the air was introduced so that the carbon film 3 on the surface of the substrate was entirely scattered. The substrate was then withdrawn from the surface and cooled. After both ends of the resulting resistive elements were polished, silver was coated thereon for terminals. The result of a test for sheet resistivity showed a value of 160Ω. With the variation of time of benzene flow from 10 minutes to 40 minutes and cycles of cracking from one to five times, several resistive elements were tested with respect to its sheet resistivity.

Figure 3:
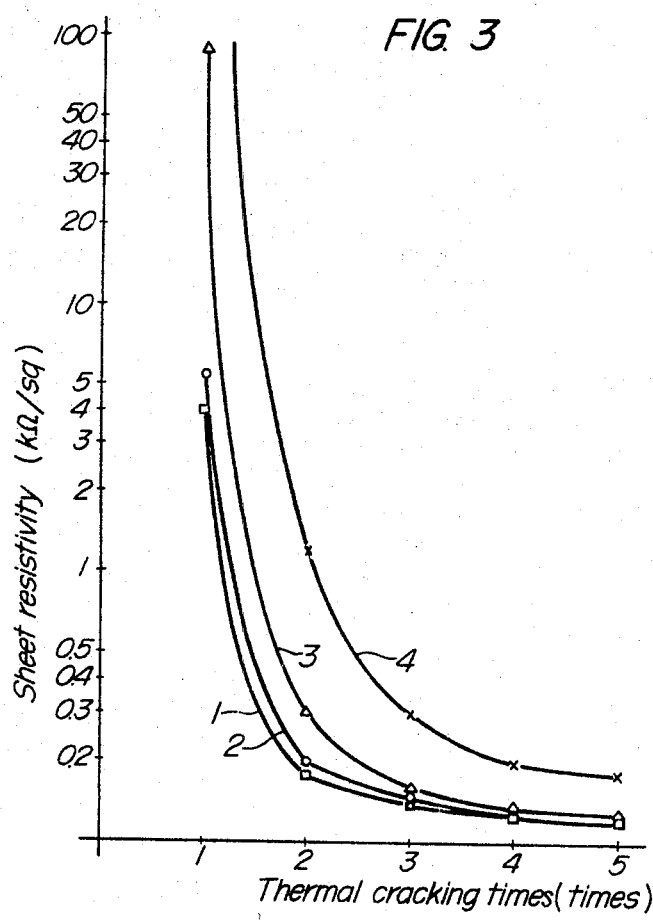
FIG. 3 is a graph showing the sheet resistivities of a resistive element of the present invention on the ordinate of logarithm calibration with the thermal cracking time by the use of benzene stream on the abscissa.

FIG. 3 shows the results of such tests, in which the numerals 1, 2, 3 and 4 represent the time of benzene flow of 40 minutes, 30 minutes, 20 minutes and ten minutes, respectively.

EXAMPLE 2

A process described with reference to FIG. 2 was effected. A porous highly siliceous glass 1', of which a perfectly contracted size was 7$\varphi$ x 23 mm., was dipped for one minute in a solution of the group consisting of an iron chloride solution (60 g./100 g. $H_2O$), a cobalt chloride solution (60 g./100 g. $H_2O$) and a nickel chloride solution (50 g./100 g. $H_2O$), followed by drying at 100° C. for two hours. It was then reduced in a hydrogen atmosphere at 800° C. for 60 minutes and removed from the furnace after cooling.

The substrate was placed in a vacuum furnace at 3 mm. Hg wherein it was allowed to stand for five minutes. Under the same reduced pressure it was subjected to a temperature of 890±3° C. and treated in the same manner as in the preceding example with a benzene flow time of 20 minutes and three cracking times. Among the resulting resistive elements thus obtained, one treated by a solution of iron chloride and thus having a resistance layer of iron-carbon-glass composition showed a sheet resistivity of about 10Ω, one treated by solution of cobalt chloride and thus having a resistance layer of cobalt-carbon-glass composition also showed a sheet resistivity of about 10Ω and one treated by a solution of nickel chloride and thus having a resistance layer of nickel-carbon-glass composition showed a sheet resistivity of about 12Ω.

EXAMPLE 3

A resistive element having a size of 7$\varphi$ x 23 mm. and a resistivity of 1 kΩ was manufactured according to a process described in Example 1. Both ends thereof were polished, on which was coated silver for terminals. 45 watt of electric power was loaded thereon and maintained as it was for 60 seconds. At this time the surface temperature was about 700° C. Thereafter it was cooled and tested with respect to its change in resistivity. The result of the tests showed that it was within ±3%.

By way of comparison, a cracked carbon resistive element (1 kΩ) and a tin oxide resistive element (60Ω), both of which were manufatcured by the conventional method and had the same size as above were loaded by 45 watt electric power. The cracked carbon resistive element was destroyed by heat in 20 to 25 seconds and the tin oxide resistive element showed a change of resistivity of +200% or more.

EXAMPLE 4

A resistive element having a size of 5$\varphi$ x 15 mm. and a resistivity of 100 to 200Ω was made according to a method of the present invention and cut into a resistor of 50 kΩ, on which following tests were effected.

Load life test

Figure 4:
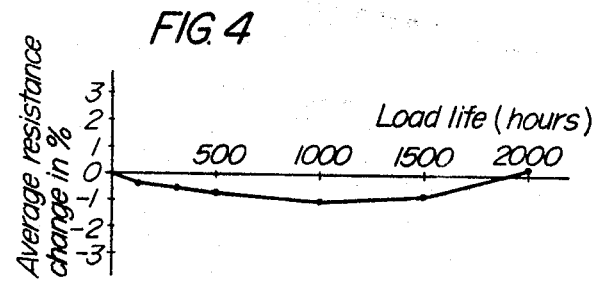
FIG. 4 is a graph showing a load life test of a resistive element of the present invention.

An ambient temperature of 70° C. and a load of 2 watt were used. A cycle of 90-minute load and 30-minute non-load was repeated for 2,000 hours, whereby the resisitivity change was measured with elapse of time. The result is shown in FIG. 4.

Humidity load life test

Figure 5:
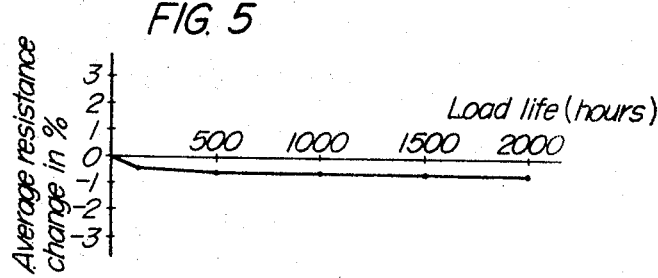
FIG. 5 is a graph showing a humidity load life test of the resistive element of FIG. 4.

An ambient temperature of 40° C., a relative humidity of 90 to 98% and a load of 2 watt were used. A cycle of 90 minute load and 30-minute non-load was repeated for 2,000 hours, whereby the resistivity change was measured with elapse of time. The result is shown in FIG. 5.

Aging variation

Figure 6:
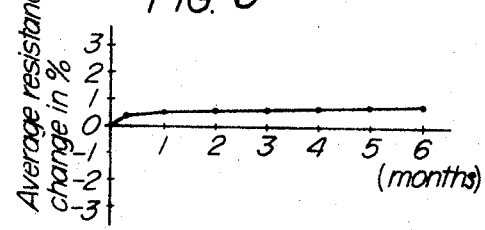
FIG. 6 is a graph showing an aging variation of resistivity of the resistive element of FIG. 4.

The specimen was allowed to stand at room temperature for six months. The resistivity change was measured each time after one month elapsed. The result is shown in FIG. 6.

What is claimed is:

1. A method for the manufacture of a resistive element having a uniform, non-porous resistance layer of carbon-glass system in the body of a glass which comprises placing a porous highly siliceous glass substrate in a furnace heated at a temperature between 850 to 1,000° C., subjecting said substrate to repeated cycles of cracking treatments to cause cracked carbon to deposit therein, one of said cycles consisting of reducing pressure and introducing a stream of hydrocarbon vapor followed by a stream of oxygen wherein said stream of oxygen being not introduced in the last cycle thereof, subjecting the substrate to a heat treatment at 900° C. or more in a non-oxidizing atmosphere so as to convert the same into a non-porous state and thereafter passing molecular oxygen containing gas on the substrate to scatter the outside carbon film only from the surface of said element.

2. A method for the manufacture of a resistive element having a uniform, non-porous resistance layer of carbon-metal-glass system in the body of a glass which comprises soaking a porous highly siliceous glass substrate in a solution of a metal compound so as to impregnate said substrate therewith, subjecting said substrate to a reduction by hydrogen or cracking under heating condition of 900° C. or below so that said compound is reduced to the corresponding metallic element, placing said substrate now including the metal in its pores in a furnace under reduced pressure and heated at a temperature between 850 and 1,000° C., subjecting said substrate to repeated cycles of cracking treatments to cause cracked carbon to deposit therein, one of said cycles consisting of reducing pressure and introducing a stream of hydrocarbon vapor followed by a stream of oxygen wherein said stream of oxygen being not introduced in the last cycle thereof, subjecting the substrate to a heat treatment at 900° C. or more in a non-oxidizing atmosphere so as to convert the same into a non-porous state and thereafter passing molecular oxygen-containing gas on the substrate to scatter the outside carbon film only from the surface of said element.

3. A resistive element having a non-porous resistance layer of carbon-glass system formed outside a non-porous glass layer and also another non-porous glass layer formed outside said resistance layer.

4. A resistive element having a non-porous resistance layer of carbon-metal-glass system formed outside a non-porous glass layer and also another non-porous glass layer formed outside said resistance layer.

References Cited
UNITED STATES PATENTS

| | | | |
|---|---|---|---|
| 2,778,743 | 3/1957 | Bowman | 338—308 |
| 3,074,817 | 4/1963 | Gentner | 338—308 |
| 3,265,519 | 8/1966 | Diefendorf. | |
| 3,390,452 | 7/1968 | Huang | 338—308 |
| 3,408,228 | 10/1968 | Cox. | |

ALFRED L. LEAVITT, Primary Examiner

M. F. ESPOSITO, Assistant Examiner

U.S. Cl. X.R.

117—46, 124, 217, 226, 227, 229; 338—308